United States Patent
Khatri et al.

(10) Patent No.: US 7,482,297 B2
(45) Date of Patent: Jan. 27, 2009

(54) SIZE CONTROLLED FIBERS, TUBES AND CHANNELS SYNTHESIZED BY HETEROGENEOUS DEPOSITION VIA SOL-GEL PROCESSING

(75) Inventors: Lubna Khatri, Elgin, IL (US); George C. Chase, Wadsworth, OH (US); Rex D. Ramsier, Berlin Center, OH (US); Prathyusha Katta, Akron, OH (US)

(73) Assignee: The University of Akron, Akron, OH (US)

( * ) Notice: Subject to any disclaimer, the term of this patent is extended or adjusted under 35 U.S.C. 154(b) by 218 days.

(21) Appl. No.: 11/239,180

(22) Filed: Sep. 29, 2005

(65) Prior Publication Data

US 2006/0065021 A1    Mar. 30, 2006

Related U.S. Application Data

(60) Provisional application No. 60/614,212, filed on Sep. 29, 2004.

(51) Int. Cl.
  *C04B 35/48* (2006.01)
  *B29C 47/00* (2006.01)
  *H05B 7/00* (2006.01)
(52) U.S. Cl. ..................... 501/95.1; 264/465
(58) Field of Classification Search ................ 501/95.1; 264/465
See application file for complete search history.

(56) References Cited

OTHER PUBLICATIONS

P. Katta et al, "Synthesis of high temperature titania nanofibers", Sep. 22, 2003, Published on public server @http://chemical.uakron.edu/fclty/chase.*
L. Khatri et al, "High Temperature Zeolite Nanofibers", Sep. 19, 2003, Published on public server @http://chemical.uakron.edu/fclty/chase.*
Caruso. Titanium Dioxide Tubes from Sol-Gel Coating of Electrospun Polymer Fibers. Advanced Mater. 2001, 13, No. 20, Oct. 16, pp. 1577-1579.*
Choi. Silica nanofibers from electrospinning/sol-gel process. Journal of Materials Science Letters 22, 2003, pp. 891-893.*
Rachel A. Caruso, Titanium Dioxide from Sol-Gel Coating of Electrospun Polymer Fibers, Advanced Materials, Oct. 16, 2001, pp. 1577-1579, No. 20, Wiley-VCH.
Katta, Khatri, Ramsier, Chase, Amer. Fil. & Sep. Conf., Nanotechnology Forum I, Oct. 2, 2003, Titania Nanofibers for High Temperature Filtration (Power Point Presentation).
Khatri, Ramsier, Chase, Amer. Fil & Sep. Conf., Nanotechnology Forum I, Oct. 2, 2003, Zeolite Nanofibers for Diesel Engine Filters (Power Point Presentation).
American Filtrations & Seprations Society Conference, Call for Papers, Diesel & Gas Engine Emission Solutions, Sep. 29, 2003-Oct. 2, 2003 (Conf. Brochure/Outline).

* cited by examiner

*Primary Examiner*—Jerry Lorengo
*Assistant Examiner*—Matthew E Hoban
(74) *Attorney, Agent, or Firm*—Roetzel & Andress; George W. Moxon, II

(57) ABSTRACT

The present invention is generally directed to a method for making sol-gel ceramic nanofibers, and the compositions resulting from practicing such method. Fibers so formed can be used for fabricating filter media and a wide variety of other ceramic fiber structures and devices.

4 Claims, 5 Drawing Sheets

SIZE CONTROLLED FIBERS, TUBES AND CHANNELS SYNTHESIZED BY HETEROGENEOUS DEPOSITION VIA SOL-GEL PROCESSING

RELATED APPLICATION DATA

This application claims priority to previously filed U.S. Provisional Application No. 60/614,212 filed on Sep. 29, 2004, entitled "Size Controlled Fibers, Tubes and Channels Synthesized by Heterogeneous Deposition Using Sol-Gel Processing", and is hereby incorporated by reference in its entirety.

FIELD OF THE INVENTION

The present invention generally relates to diameter-controlled nanostructured fibrous materials made through a process including deposition of a sol-gel film on an organic fiber followed by removing or degrading the organic fiber. The structures obtained thereby can be compact nanofibers or other similar or related structures. In general, the fibers obtained by the process of the present invention have substantially continuous surfaces rather than open, porous or vented surfaces.

BACKGROUND OF THE INVENTION

Forming nanofibrous ceramic materials can be challenging for a variety of reasons, including that ceramics are not generally amenable to ordinary fiber spinning techniques. The present invention overcomes this obstacle by forming ceramic nanofibers in a two stage process. In the first stage, an ordinary organic nanofiber is spun by any of a variety of conventional means. In the second stage, the ceramic fiber is formed by depositing a sol-gel film on the organic fiber and then degrading or otherwise removing the organic fibrous portion.

SUMMARY OF THE INVENTION

The present invention generally relates to a method for making a variety of diameter-controlled nanofibrous structures including solid fibers and other similar or related structures. The present invention also generally relates to the compositions made according to the methods of the present invention.

More particularly, the present invention is directed to a method for manufacturing a fiber comprising the steps of providing an organic fiber having a diameter that is selected as a template for forming a ceramic nanofiber of a similar size; coating an external surface of the polymeric fiber with a sol-gel coating, wherein the coating comprises a metal halide, metal alkoxide, or metal oxide; heating the coated polymeric fiber to a temperature sufficient to remove the polymeric fiber and form a fiber comprising substantially metal oxide, wherein removal comprises melting or pyrolyzing, and such removal results in forming a substantially solid fiber having a substantially continuous surface; and annealing the substantially metal oxide fiber at a temperature from about 600° C. to about 800° C. Additionally, the present invention is generally related to a fibrous composition made according to foregoing method.

BRIEF DESCRIPTION F THE FIGURES

DETAILED DESCRIPTION OF THE INVENTION

Figure 1:
FIG. 1 is a SEM of hollow nanofibrous structures after removing the inner polymer core.

The present invention generally relates to a process for fabricating diameter-controlled compact nanofibers fibers and related structures by sol-gel processing. More particularly, the present invention generally relates to a process for forming such nanostructures, wherein the process includes depositing sol-gel reagents on nanofibers and then melting or pyrolyzing the organic nanofiber, which results in compacting the fibrous structure. In general the fibers obtained by the process of the present invention have nano-scale diameters.

As used herein the term nano-scale diameter includes diameters from about 1 nm to about 1000 nm. The term also includes diameters from about 100 nm to about 400 nm, and from about 200 nm to about 400 nm.

As used herein, the term substantially continuous surface includes fiber surfaces substantially free from openings, vents, and the like, that can result from removing the organic polymer portion. The term is not meant to exclude materials having openings, pores or vents formed by other processes, or due to other physical properties. For instance, the term is not intended to exclude the pores that are inherent in zeolite crystal structures.

The present invention relates to using sol-gel processing to deposit any of a variety of metal oxides, silicates and/or aluminosilicates. Furthermore, such deposition typically involves heterogeneous growth of such sol-gel nanostructures on the surface of continuous electrospun nanofibers comprising one or more organic polymers. Thus, the process of the present invention includes forming at least a two-layered structure wherein an inner core comprises an organic nanofiber, and an outer layer comprises a sol-gel film. The fiber is formed from the two-layered structure by melting, pyrolyzing, or otherwise removing the polymer core, leaving behind highly temperature-resistant metal oxide, silicate and/or aluminosilicate fibers. The process of removing the organic polymer fiber generally causes the sol-gel portion to form a compacted solid structure. Furthermore, the diameter of the solid sol-gel fiber thus formed can be adjusted by controlling certain process parameters, such as organic fiber diameter, deposition time, metal alkoxide concentration, and pH. Significantly, the present invention is not limited to nano-scale structures. Rather, the process of the present invention can be adapted to form structures having a wide variety of dimensions including 1, 10, and 100 micron scale structures.

Depositing the sol-gel layer on organic fibers can be conducted in a variety of ways including, without limitation, depositing sol-gel precursors such as metal alkoxides; metal halides; or colloidal particles comprising metal oxides, silicates or aluminosilicates. Furthermore metal alkoxides within the scope of the present invention include, without limitation, titanium methoxides, titanium ethoxides, titanium propoxides, and the like and any combination thereof; silicon methoxides, silicon ethoxides, silicon propoxides, and the like and any combination thereof; and zirconium methoxides, zirconium ethoxides, zirconium propoxides, and the like and any combination thereof. Furthermore, metal alkoxides within the scope of the present invention include alkoxides of tin, indium, aluminum, germanium, gallium, zinc and the like and any combination thereof.

Additionally, metal halides within the scope of the present invention include, without limitation, chlorides and bromides of titanium, silicon, zirconium, indium, aluminum, germanium, gallium, zinc and the like and any combination thereof. Finally, metal oxides within the scope of the present invention include, without limitation, oxides of titanium, silicon, zirconium, indium, aluminum, germanium, gallium, zinc and the like and any combination thereof.

Organic nanofibers of the present invention can be formed in any of a variety of known ways from any of a variety of spinnable polymers. For instance, appropriate methods for forming nanofibers include, without limitation, electrospinning, nanofibers by gas jet (NGJ), wet spinning, dry spinning, melt spinning, and gel spinning. Furthermore, polymer materials within the scope of the present invention include without limitation nylon, polyimide, poly lactic acid and the like and any combination thereof.

Exemplary patents that disclose NGJ methods include U.S. Pat. Nos. 6,695,992; 6,520,425; and 6,382,526, all of which are incorporated by reference in their entireties. A suitable electrospinning process is disclosed in, for example, U.S. Pat. No. 6,753,454, which is hereby incorporated by reference in its entirety.

EXAMPLE 1

An example of the present invention comprises the synthesis of compact solid silica fibers as described below. A sol-gel solution is made by adding tetraethyl orthosilicate (TEOS) (44.7 mL, 0.2 M), ammonium hydroxide (18 mL, 0.2 M), and water (45 mL, 3.2 M) to a reaction vessel, which is topped off to 1 liter using ethanol (about 890 mL). Nylon 6 (20 wt % solution in formic acid) nanofibers are electrospun at 15 cm distance and 20 kV directly into the sol-gel solution. The sol-gel solution with the Nylon-6 fibers suspended therein is left at room temperature for about 20 hours without agitation. The particle size resulting from this process is about 100 nm. The nylon 6 web does not dissolve. The web is washed twice by suspending in ethanol and centrifuging at about 10,000 rpm, and then dried at about 110° C. The fibers are then heated at 275° C. to remove the inner polymer fiber. As shown in FIG. 1, the SEM of the product demonstrates that the nanofibers are intact after the heating process, and that the fibers have shrunk in size. There is no evidence of any hollow core structure in these images, indicating that these are compact solid fibers.

EXAMPLE 2

In another example of the present invention nanostructures are produced according to the following process. Sol gel precursor is prepared using titanium isopropoxide, isopropanol, nitric acid and triply distilled filtered water. The chemicals are used as received without further purification. The concentration of the nitric acid is adjusted to about 5 M by addition of triply distilled filtered water. Distilled water (144 ml) is mixed with 20 ml of nitric acid with vigorous stirring. Isopropanol (10 mL) is added to the resultant solution drop by drop under stirring. Cloudiness forms instantaneously after adding about 2 ml of titanium isopropoxide, and a transparent solution is produced after aqua-sonicating for 30 minutes. Electrospun polymer mats are soaked in the sol gel solution resulting in hydrolysis and condensation reactions. The whole mixture is kept at 60° C. for 3 hours in order to obtain rutile-coated polymer nanofibers. The same procedure, but at 90° C. for 1.5 hours, is used to create anatase-coated polymer nanofibers. Milky white precipitates are observed indicating the formation of titania nanoparticles.

The anatase to rutile transition takes place around 400° C. The crystalline structure of the titania can be altered by controlling the synthesis temperature and the concentration of the nitric acid. Uniformly coated polymer nanofibers are heated above the melting temperature of the polymer (275° C.) in order to degrade or remove polymer template. The sol gel coated nanofibers retain the fibrous morphology even after melting of the polymer nanofibers. Calcination at 300° C. and 700° C. produces anatase and rutile titania nanofibers, respectively.

Figure 2:
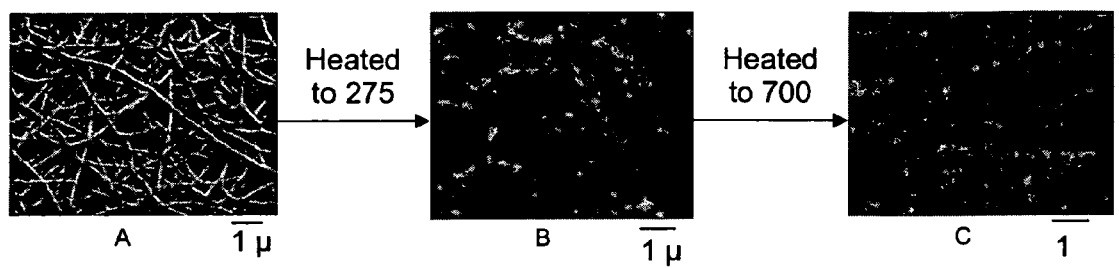
FIG. 2(A) is a SEM image of titania coated nylon-6 nanofibers; (B) is a SEM of titania coated nylon-6 nanofibers heated at 275° C. for 2 hours; (C) is a SEM image of titania nanofibers heated at 700° C. for 2 hours.

Scanning electron microscope (SEM) images of rutile titania-coated nanofibers having diameters about 200 nm can be seen in FIG. 2A. FIG. 2B is an image of titania nanofibers after sol-gel processing and slow heating to 275° C. in an oven for 2 hours. Heating the resultant nanofibers to 700° C. pyrolyzes the nylon-6 completely, leaving titania nanofibers with 150 nm diameters as seen in FIG. 2C. Shrinkage in the diameter of the nanofibers is observed when the nanofibers are heated, due to the thermal degradation of the polymer.

EXAMPLE 3

In another example of the present invention hollow nanofibrous structures are formed according to the following process. In order to sol-gel coat 0.2 grams of nylon-6 nanofibers, 110 ml of filtered distilled water is added to 15.2 ml of 5 M nitric acid at room temperature. After mixing, 7.6 ml of 2-propanol is then slowly added. Next, 1.6 ml of titanium isopropoxide is gradually added with a pipette and the solution is ultrasonically agitated for 30 minutes. After half an hour the solution becomes transparent indicating the formation of a sol having nano-scale particles. The electrospun polymer nanofibers are then placed in the sol and the mixture is heated to 65° C. for two hours. This induces the growth of titania nanoparticles on the surface of the nanofibers. The solution becomes cloudy after about two hours, indicating precipitation. The precipitate is separated from the solution by washing several times with methanol, which also removed residual alkoxides.

The electrospinning and sol-gel synthesis steps result in a coated nanofiber mat. After sol-gel processing the nanofibers are heated to 275° C., which converts the sol-gel and leads to fibers with diameters of about 200 nm. Heating the resultant nanofibers to 700° C. pyrolyzes the nylon-6, leaving titania nanofibers having 150-200 nm diameters.

Figure 3:
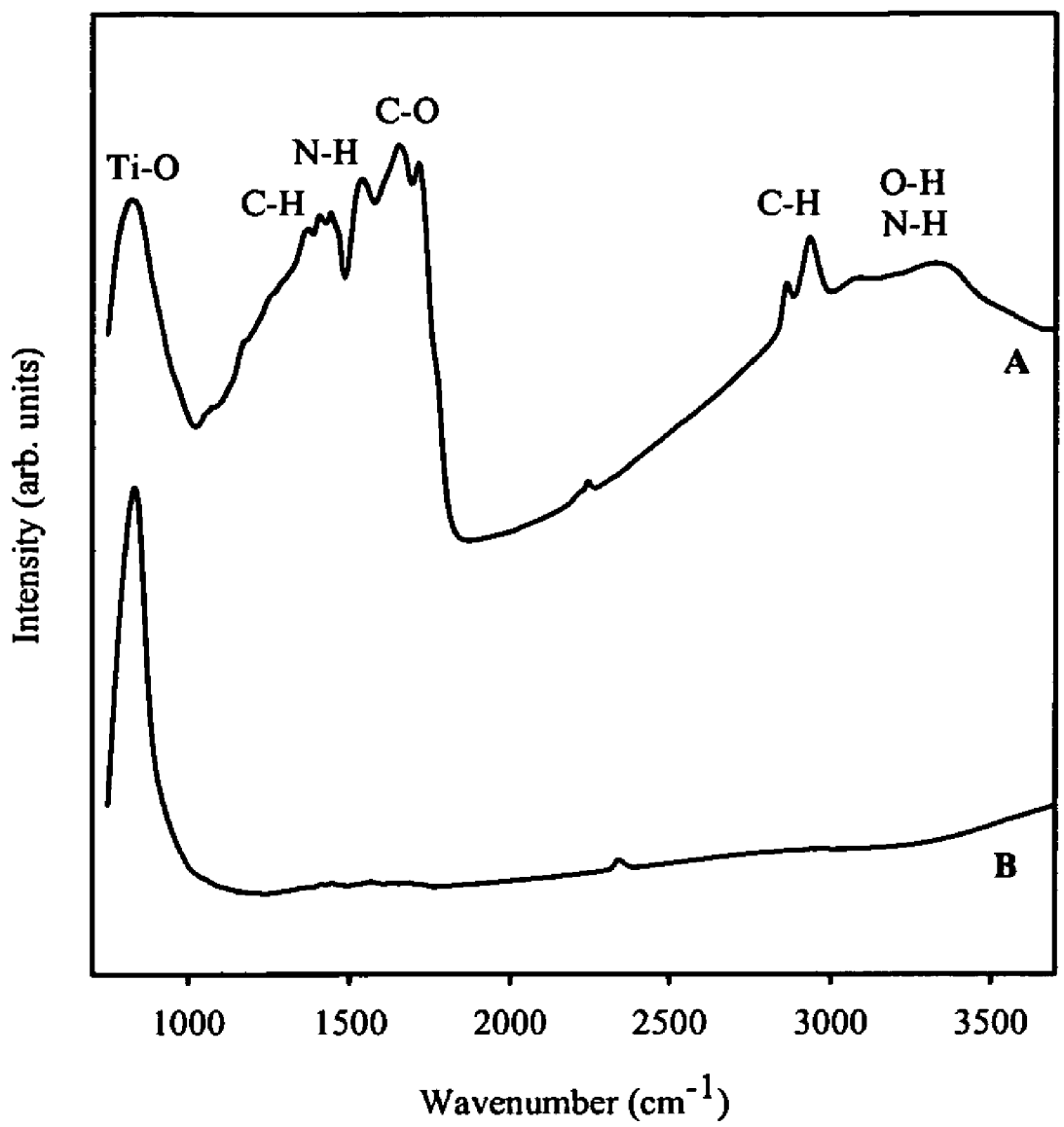
FIG. 3 is a Fourier transform infrared spectrum showing evidence of pyrolysis.

Evidence for pyrolysis of the nylon-6 is provided by the Fourier transform infrared spectra of FIG. 3. Curve A in FIG. 3 indicates that the coated fibers have significant IR absorption features due to the N—H, C—H, and C—O vibrations of nylon after two hours of heating at 275° C. Moisture incorporation may also lead to O—H stretching vibrations, which overlap with the N—H stretching region above 3000 $cm^{-1}$. Furthermore, since Ti—O vibrations are present, it appears that heating results in titania formation. As shown in Curve B of FIG. 3, after annealing the fibers at 700° C. only Ti—O vibrations remain, indicating that pyrolysis of the nylon-6 material has occurred.

Figure 4:
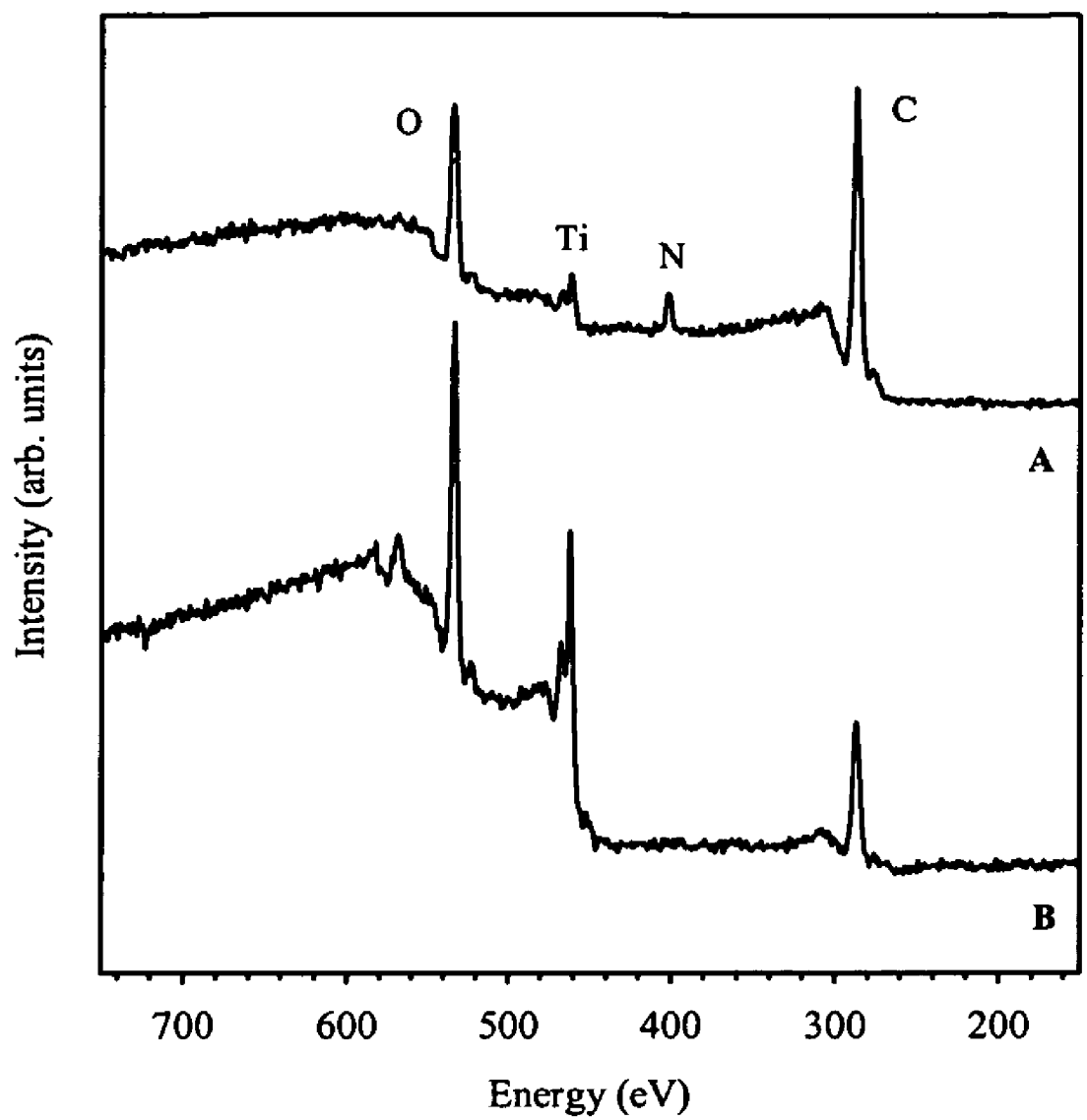
FIG. 4 is an X-ray photoelectron spectrum showing evidence of pyrolysis.

The IR data of FIG. 3 are consistent with the X-ray photoelectron spectra (XPS) of FIG. 4. In FIG. 4A, the coated fibers heated to 275° C. contain significant amounts of carbon and nitrogen due to the nylon-6. Annealing for two hours at 700° C. diminishes both the C and N XPS features significantly, leaving a spectrum in FIG. 4B that is expected for titania. Some adventitious carbon remains on or within the titania nanofibers as shown in FIG. 4B.

Figure 5:
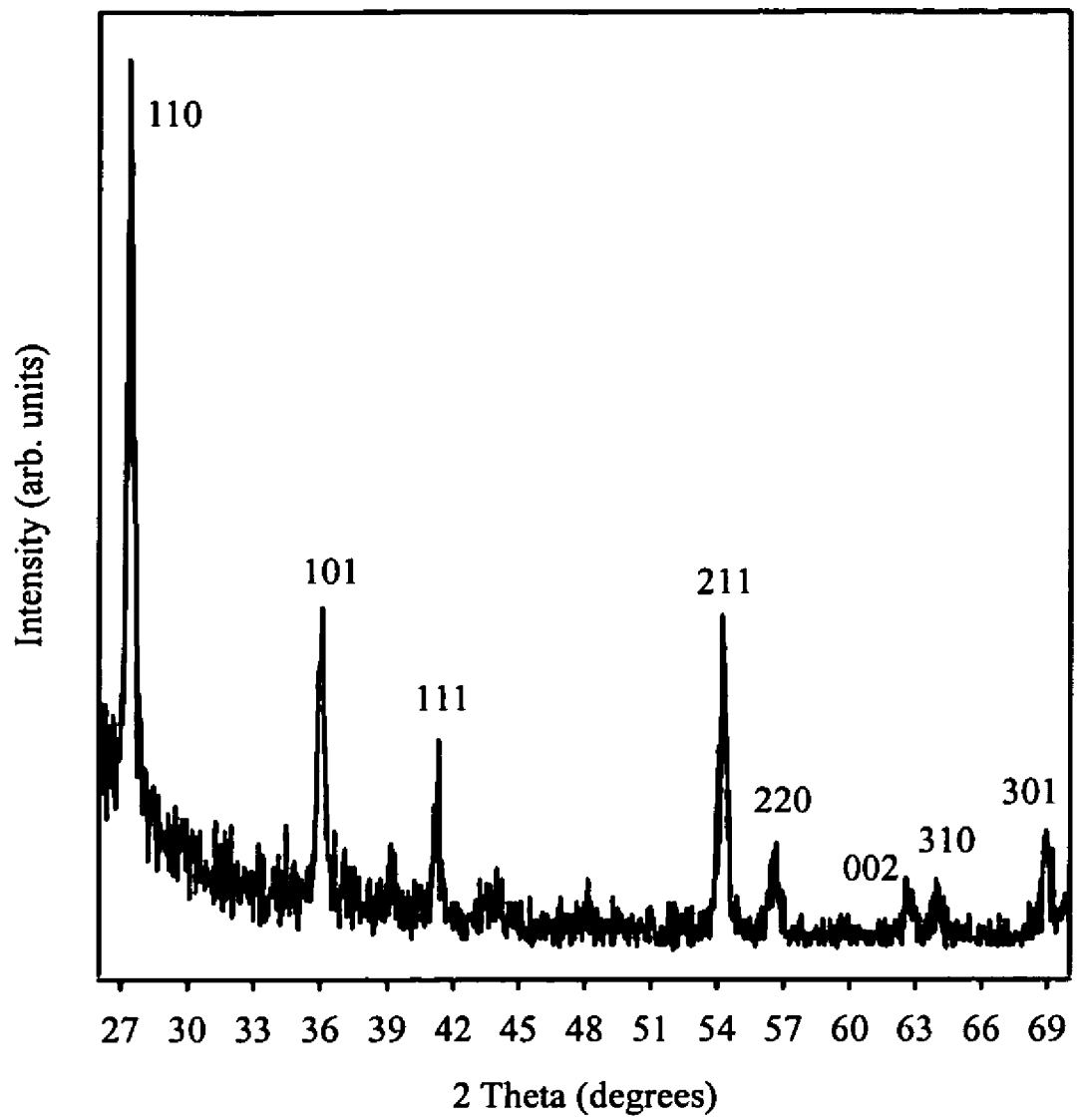
FIG. 5 is an X-ray diffraction spectrum showing rutile reflection planes.

Titania usually undergoes an anatase to rutile phase transition above 450° C. The X-ray diffraction (XRD) pattern of FIG. 5 verifies that the nanofibers are in the rutile phase after annealing at 700° C. for two hours.

EXAMPLE 4

In another example of the present invention, fibers made according to the methods disclosed herein can be used to form a filter medium. For instance, the fibers of the present invention can be worked up into a slurry with binder components, and then passed through a wire mesh under vacuum thereby forming a filter cake, which can be dried, calcined, annealed and/or sintered to form a filter medium.

The foregoing examples are considered only illustrative of the principles of the invention rather than an exclusive list of embodiments. Further, since numerous modifications and changes will readily occur to those of ordinary skill in the art, the invention is not intended to be limited to the exact construction and operation shown and described, and accordingly, all suitable modifications and equivalents are within the scope of the present invention.

We claim:

1. A method for manufacturing a fiber comprising the steps:
   providing an organic fiber having a diameter that is selected as a template for forming a ceramic nanofiber of a similar size;
   coating an external surface of a polymeric fiber with a sol-gel coating, wherein the coating comprises a metal halide, metal alkoxide, or metal oxide;
   heating the coated polymeric fiber to a temperature above the melt point of the polymeric fiber to remove the polymeric fiber and form a fiber comprising substantially metal oxide, wherein removal comprises melting or pyrolyzing, and such removal results in forming a solid fiber having a substantially continuous surface; and
   annealing the substantially metal oxide fiber at a temperature from about 600° C. to about 800° C.

2. The method of claim 1, wherein the step of heating is carried out at a temperature from about 275° C. to about 400° C.

3. The method of claim 1, wherein the polymeric fiber comprises nylon, polylactic acid, polyimide or any combination thereof.

4. The method of claim 1, wherein the sol-gel coating comprises titania, silica, zirconia, zinc oxide, zeolite or any combination thereof.

* * * * *